UNITED STATES PATENT OFFICE.

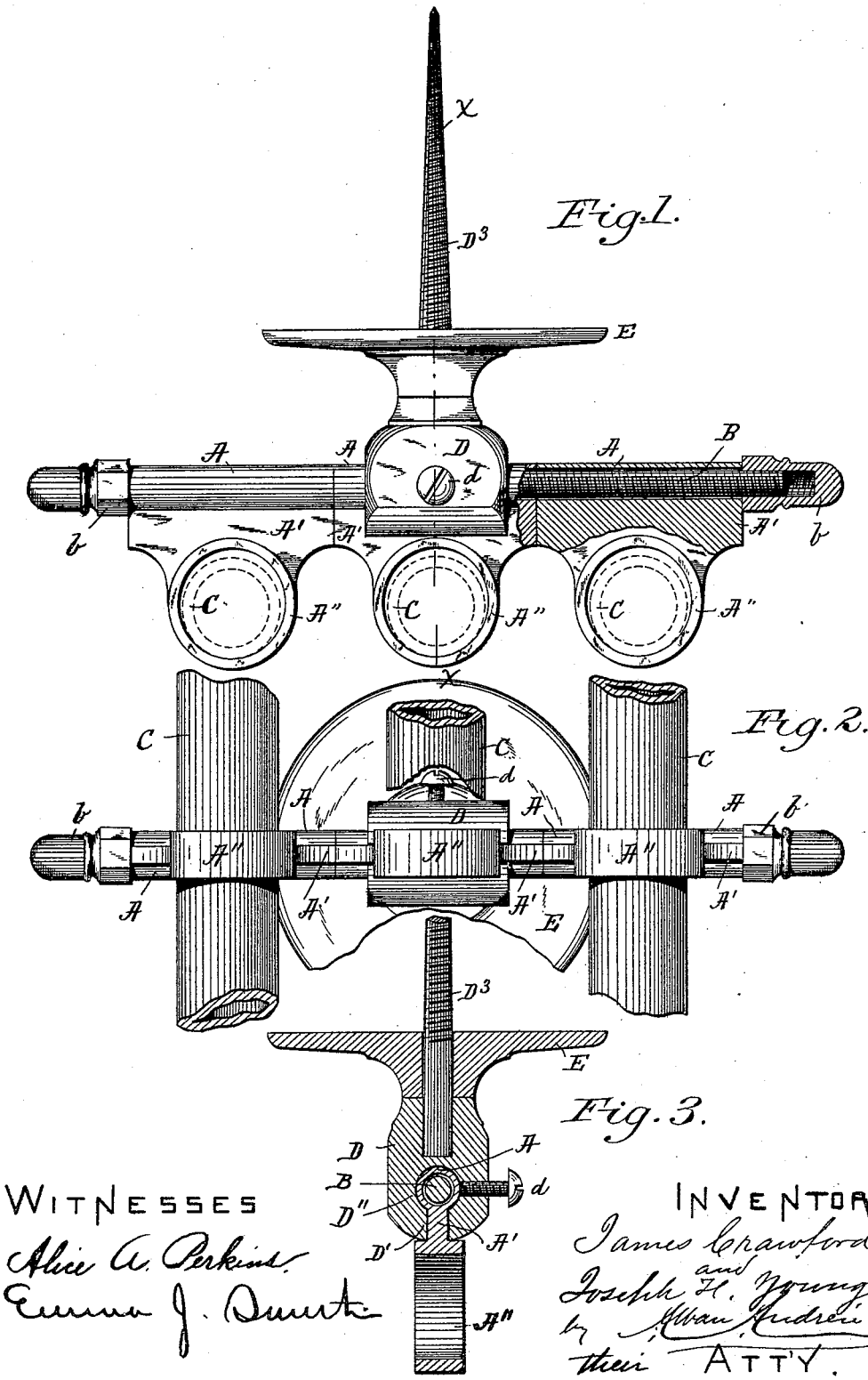

JAMES CRAWFORD AND JOSEPH H. YOUNG, OF CAMBRIDGE, MASSACHUSETTS.

PIPE-SUPPORTING DEVICE.

SPECIFICATION forming part of Letters Patent No. 460,631, dated October 6, 1891.

Application filed March 27, 1891. Serial No. 386,598. (No model.)

*To all whom it may concern:*

Be it known that we, JAMES CRAWFORD and JOSEPH H. YOUNG, both citizens of the United States, and residents of Cambridge, in the county of Middlesex and State of Massachusetts, have jointly invented new and useful Improvements in Pipe-Supporting Devices, of which the following, taken in connection with the accompanying drawings, is a specification.

This invention relates to improvements in pipe-supporting devices, and it is particularly well adapted for the purpose of hanging or supporting water-pipes, &c., either from the ceiling or walls of a room or building, as will hereinafter be more fully shown and described, reference being had to the accompanying drawings, wherein—

Figure 1 represents a plan view of the invention, a portion of which is shown in section. Fig. 2 represents a front elevation, and Fig. 3 represents a cross-section on the line X X, shown in Fig. 1.

Similar letters refer to similar parts wherever they occur on the different parts of the drawings.

The device consists of one or more tubular sections A A A, according to the number of pipes that are to be supported, said sections being secured together by means of a screw-threaded rod or spindle B, passing loosely through said tubular parts and provided with nuts $b\ b$ at its ends, by means of which the sections are firmly clamped together in a line with each other, as shown in the drawings. Each section A has made in one piece with it a preferably-flattened shank A', terminating as a ring A'', adapted to receive the pipe C, that is to be supported by the device. In connection with such sections we use a clamp or hanger D, having a slit D' in its lower end, the upper portion of which is made cylindrical, as shown at D'' in Fig. 3, or of such form and size as to receive the shank A' and the cylindrical section A, which are inserted endwise in the said grooved clamp, and afterward preferably secured to it by means of a set-screw $d$ or equivalent device.

$D^3$ is a screw made in one piece with or secured in a suitable manner to the clamp or hanger D, as shown in Figs. 1 and 3, by means of which the latter is secured to the wall or ceiling.

For the purpose of preventing defacement of the wall or ceiling, as well as to give a finish to the device, we prefer to use a perforated washer E between the hanger D and wall F, as shown in Figs. 1 and 3; but this is not essential, as, if so desired, it may be dispensed with or made in one piece with the clamp D without departing from the essence of our invention.

This our invention is very simple and practical, and by its use one or more pipes may be hung or supported from a single clamp or hanger, and if at any time it is desirable to increase or decrease the number of pipes originally hung this can be done simply by adding or removing one or more of the sections A A and using a correspondingly longer or shorter screw-bolt B, as the case may be.

Having thus fully described the nature, construction, and operation of our invention, we wish to secure by Letters Patent and claim—

1. The herein-described pipe-supporting device, consisting of a cylindrical section A, having a ring A'', adapted to receive the pipe, and a shank A', combined with a clamp or hanger D, having a cylindrical recess D'', adapted to receive the section A, a slitted portion D', adapted to receive the shank A', and means for securing said section and hanger together, substantially as and for the purpose set forth.

2. The herein-described pipe-supporting device, consisting of two or more tubular sections A A, having rings A'' A'', adapted to receive the pipes to be supported and having a clamp-screw and nuts for holding said sections together, combined with the slitted hanger D, having a screw-threaded bolt $D^3$ for securing it to the wall or ceiling, and means for securing said clamp or hanger to the sections, substantially as and for the purpose set forth.

3. In combination, one or more tubular sections A A, having rings A'' A'' and a screw-bolt and nuts for securing said sections together, a slitted clamp or hanger adapted to hold said sections, a screw-bolt on said hanger for securing it to the wall or ceiling, and means for securing the sections to the hanger, substantially as and for the purpose set forth.

In testimony whereof we have signed our names to this specification, in the presence of two subscribing witnesses, on this 18th day of March, A. D. 1891.

JAMES CRAWFORD.
      JOSEPH H. YOUNG.

Witnesses:
 ALBAN ANDRÉN,
 ALICE A. PERKINS.